(12) United States Patent
Crawford et al.

(10) Patent No.: US 10,626,766 B2
(45) Date of Patent: *Apr. 21, 2020

(54) GASEOUS EMISSIONS TREATMENT SYSTEM WITH ENHANCED INDUCTION HEATING AND METHOD OF USE

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,150

(22) Filed: Mar. 27, 2019

(65) Prior Publication Data

US 2019/0218949 A1 Jul. 18, 2019

Related U.S. Application Data

(63) Continuation-in-part of application No. 15/343,533, filed on Nov. 4, 2016, now Pat. No. 10,267,719, and a continuation-in-part of application No. 15/259,858, filed on Sep. 8, 2016, now Pat. No. 10,352,214, which (Continued)

(51) Int. Cl.
*F01N 3/08* (2006.01)
*F01N 3/20* (2006.01)
*H05B 6/10* (2006.01)
*H05B 6/36* (2006.01)
*F01N 9/00* (2006.01)

(52) U.S. Cl.
CPC ............ *F01N 3/0892* (2013.01); *F01N 3/08* (2013.01); *F01N 3/2013* (2013.01); *F01N 9/00* (2013.01); *H05B 6/108* (2013.01); *H05B 6/365* (2013.01); *F01N 2240/05* (2013.01); *F01N 2240/16* (2013.01); *F01N 2900/1602* (2013.01)

(58) Field of Classification Search
CPC ........ F01N 3/08; F01N 3/0892; F01N 3/2013; F01N 9/00; F01N 2240/05; H05B 6/108
USPC ............................ 422/174, 179, 180; 60/300
See application file for complete search history.

(56) References Cited

U.S. PATENT DOCUMENTS 5,569,455 A * 10/1996 Fukui .................. B01D 53/945
422/174
8,292,987 B2 * 10/2012 Gonze .................... F01N 3/027
55/282.3

(Continued)

*Primary Examiner* — Tom P Duong
(74) *Attorney, Agent, or Firm* — Stuart L. Wilkinson (57) ABSTRACT

A gaseous emissions treatment system includes an emissions control substrate having a plurality of passages to facilitate a catalytic reaction in an exhaust gas from an internal combustion engine. A magnetic field generator responds to a control signal by generating a varying magnetic field to inductively heat the emission control substrate. A magnetic field concentrator is configured and positioned to increase the radiated varying magnetic field in a region on the same side of the magnetic field concentrator as the emissions control substrate. The magnetic field concentrator also acts as a shield to reduce the radiated varying magnetic field in a region on the distal side of the magnetic field concentrator from the emissions control substrate.

26 Claims, 3 Drawing Sheets

Related U.S. Application Data is a continuation of application No. 14/452,800, filed on Aug. 6, 2014, now Pat. No. 9,488,085.

(60) Provisional application No. 62/258,071, filed on Nov. 20, 2015, provisional application No. 61/879,211, filed on Sep. 18, 2013, provisional application No. 61/910,067, filed on Nov. 28, 2013.

(56) References Cited

U.S. PATENT DOCUMENTS

| | | | |
|---|---|---|---|
| 10,352,214 B2 * | 7/2019 | Crawford | F01N 3/2026 |
| 2016/0281679 A1 * | 9/2016 | Wichers | H02K 7/1838 |

* cited by examiner

GASEOUS EMISSIONS TREATMENT SYSTEM WITH ENHANCED INDUCTION HEATING AND METHOD OF USE

CROSS REFERENCE TO RELATED PATENTS

The present U.S. Patent Applications is a continuation-in-part application of pending U.S. patent application Ser. No. 15/343,533 filed Nov. 4, 2016 entitled "Emission control system with controlled induction heating and methods for use therewith" which claims priority pursuant to 35 U.S.C. 119(e) from U.S. Provisional Application Ser. No. 62/258,071 filed Nov. 20, 2015 entitled "Catalytic converter system with controlled induction heating and methods for use therewith". The present U.S. Patent Applications is a continuation-in-part application of pending U.S. patent application Ser. No. 15/259,858 filed Sep. 8, 2016 entitled "Gaseous emissions treatment structures with induction heating" which is a continuation of U.S. patent application Ser. No. 14/452,800 filed Aug. 6, 2014 entitled "Catalytic converter structures with induction heating", issued as U.S. Pat. No. 9,488,085 on Nov. 8, 2016, which claims priority pursuant to 35 U.S.C. 119(e) from U.S. Provisional Application Ser. No. 61/879,211 filed Sep. 18, 2013 entitled "Catalytic converter employing electrohydrodynamic technology" and from U.S. Provisional Application Ser. No. 61/910,067 filed Nov. 28, 2013 entitled "Catalytic converter using field heating of metal component". The above-mentioned applications and patents are hereby incorporated herein by reference in their entirety and made part of the present U.S. Patent Applications for all purposes.

FIELD OF THE INVENTION

This invention relates to gaseous emissions treatment structures and methods for use thereof, such structures having particular but not exclusive application to catalytic converters, particulate filters (PFs) and like structures for treating exhaust gases to reduce harmful pollution.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and DPFs are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and PFs have low efficiency when cold, i.e. the running temperature from ambient air start-up temperature to a temperature of the order typically of 300 C or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

U.S. Pat. No. 9,488,085 (Catalytic converter structures with induction heating) shows a catalytic converter assembly having a substrate body with a plurality of cells for passage therethrough of exhaust gases. Metal is located at predetermined locations in the substrate body and an electromagnetic field generator is mounted adjacent the substrate body for generating a varying electromagnetic field inductively to heat the metal and so heat the substrate body.

SUMMARY OF THE INVENTION

Brief Description of the Drawing

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
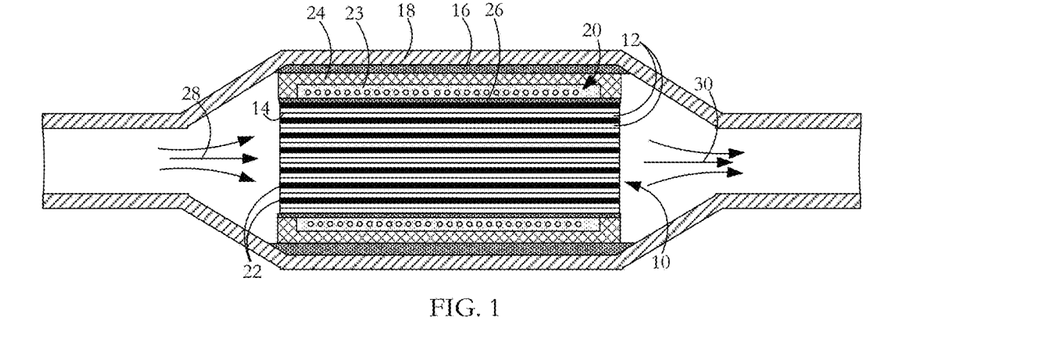
FIG. 1 is a longitudinal sectional view of a gaseous emissions treatment unit configured for induction heating.

A gaseous emissions treatment assembly suitable for use, for example, in motor vehicles, may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material—containing clay or a mixture of clay and particulate ceramic—is extruded through an appropriately shaped die, with units being cut successively from the extrusion. The units are fired to convert the clay component to ceramic and are then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters, there may or may not be a catalyst coating on the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the one subset into cells of the other subset.

In the catalytic converter, interiors of the tubular cells 12 are wash-coated with a layer containing a particular catalyst material. A wash-coat typically contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems. The present invention is applicable also to each of these nitrogen oxide emissions treatment assemblies.

A gaseous emissions treatment system may have a series of the substrate bodies or bricks 10, each having a particular catalyst layer or emissions treatment mode depending on the noxious emission to be reduced or neutralized. Gaseous emissions treatment bricks may be made of materials other than fired ceramic, such as stainless steel. Also, they may have forms of honeycombed cells or passages different from those described above. For example, cells can be round, square, hexagonal, triangular or other convenient cross-sectional shape. In addition, if desired for optimizing strength and low thermal capacity or for other purposes, some can be formed to be thicker than other walls or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous insulation blanket 16. A sheet metal casing or can 18 transitions between the parts of an exhaust pipe (not shown) fore and aft of the gaseous emissions treatment component so as to encompass the blanket-wrapped brick 10. The casing 18 is typically made up of two parts which are welded to seal the brick in place. The blanket 16 provides a buffer between the casing 18 and the brick 10 to accommodate their dissimilar thermal expansion coefficients. The metal of the sheet metal casing 18 expands much more than the ceramic material of the brick over a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body 10.

In use, the encased brick (or bricks) is mounted in the vehicle exhaust line to receive exhaust gases from the engine and to pass them to the vehicle tail pipe. Exhaust gases 28 to be treated enter the front 36 of the gaseous emissions treatment component 10 and treated exhaust gases 30 exit from its rear 40. In the course of passing along the cells 14, the exhaust gases, the ceramic brick 10 and the catalyst coating on the cell walls are heated to promote treatment processes where the flowing gases contact the hot catalyst layer. Especially when the vehicle engine is being run at optimal operating temperature and when there is substantial throughput of exhaust gases, such treatment components operate substantially to reduce the presence of noxious gaseous emissions entering the atmosphere. Such components have shortcomings however at start-up when the interior of the brick is at low temperature, during idling periods in city driving or when waiting for a coffee at a Tim Hortons drive-through, and between electric driving periods for hybrid vehicles.

Brick shape, profile and cell densities vary among different manufacturers. For example, while most bricks are round, some are oval, square or irregular in cross-sectional shape. Some assemblies have single stage bricks that are generally heavily wash-coated with the catalyst metals, while others may have two or three bricks with different wash-coatings in each brick. Some exhausts have 400, 600 and 900 (or higher) cpsi cell densities used in the full exhaust assembly, while others use only 400 cpsi bricks throughout. A close-coupled converter may be mounted up close to the exhaust manifold with a view to reducing the period between start-up and light-off temperature. An underfloor converter can be located further from the engine where it will take relatively longer to heat up but be relatively larger and used to treat the majority of gases once the exhaust assembly is up to temperature. In another configuration, a component for reducing the period to light-off temperature and a component to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction heating is switched on and off. Using an appropriate algorithm implemented at the controller, the monitored temperatures may also be used to control specific effects of the applied heating processes to achieve a particular heating pattern.

As disclosed in U.S. Pat. No. 9,488,085, the gaseous emissions treatment assembly of FIG. 1 is modified to enable induction heating, a process in which a conducting body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000s to 1,000,000s cycles per second (Hz) depending on the material, mass, and shape of the ferromagnetic metal body. Magnetic domain polarity is not easily reversed and the resistance to reversal causes further heat generation in the metal.

Figure 2:
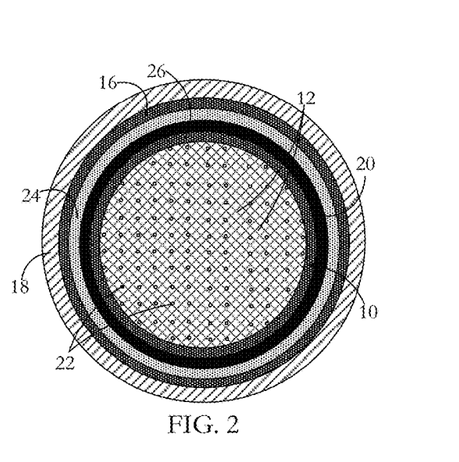
FIG. 2 is a cross-sectional view of the unit of FIG. 1.
Figure 3:
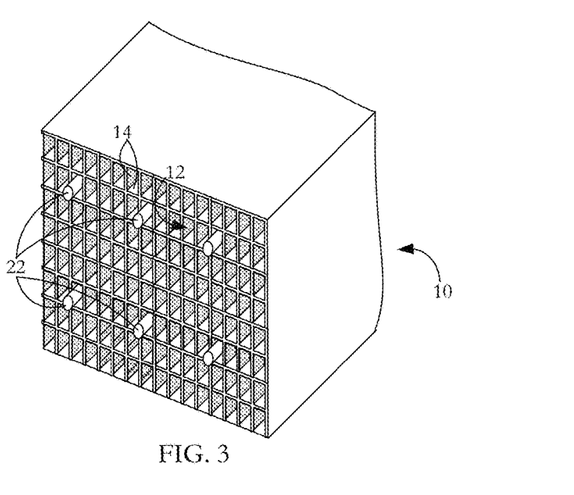
FIG. 3 is a perspective sectional view of a part of a gaseous emissions treatment unit according to an embodiment of the invention showing metal inserts located in cells of a substrate body.

As illustrated in FIGS. 1 and 2, surrounding the ceramic substrate body 10 is a metal coil 20 although other forms of magnetic field generator can be used. Located within selected ones of the cells 12 are conducting elements 22 (FIG. 3) such as metal wires/pins. By generating a varying electromagnetic field at the coil 20, a chain reaction is initiated, the end result of which is that after start-up of a vehicle equipped with an exhaust system embodying the invention, light-off temperature may be attained more quickly in the presence of the varying electromagnetic induction field than if there were no such field. The chain reaction is as follows: the varying electromagnetic field induces eddy currents in the metal elements 22; the eddy currents cause heating of the metal elements; heat from the metal elements 22 is transferred to the ceramic substrate body 10; heat from the heated substrate body 10 is transferred to exhaust gas as it passes through the emissions control component; and the heated exhaust gas causes exothermic catalytic reactions to be initiated more quickly at the walls 14 compared to the period to initiation by exhaust gas having only heating from operation of the vehicle engine. Conduction from the heated metal elements 22 is the primary source of heat transfer to the ceramic substrate 10 and therefore to the exhaust gases when the emissions component is in operation. There is also a small amount of convective and radiated heat transfer at any small air gaps between metal elements such as wires 22 and the interior surface of the cells 12 within which they are contained.

The coil 20 is a wound length of copper tube, although other materials such as copper wire or litz wire may be used. Copper tube offers high surface area in terms of other dimensions of the coil. Induction being a skin-effect phenomenon, high surface area is of advantage in generating the varying field. If litz wire or copper wire is used, an enamel or other coating on the wire is of such composition that it does not burn off during sustained high temperature operation of the converter. The coil wire 32 can have sheathing 34 to prevent adjacent coil turns from shorting to each other or to a surrounding magnetic flux concentrator (MFC) 24. The coil 20 is frictionally and mechanically retained in position. Friction prevents the coil from sliding along the adjacent surface of the MFC, while dimensions of surrounding elements are selected so that the coil can be sprung and locked into place. In addition or as an alternative, a variation in MFC thickness for accommodating lead wires to and from the coil is used to mechanically lock, or assist in locking, the coil in place. In a further alternative, the coil is encased in any of cast, cured mastic insulation 23, high temperature adhesive, or, if adequately supported by other parts of the assembly, by air.

A thermal insulation layer 26 positioned between the ceramic substrate 10 and the coil 20 prevents significant heat transfer from the inductively heated metal elements 22 through the ceramic substrate 10 to the coil 10. Such heat transfer would otherwise increase coil resistivity so lowering its efficiency, and might also damage the coil. The insulation layer 26 also operates to stabilize the coil position and to create an air-tight seal to confine passage of exhaust gases 28 through the ceramic honeycomb substrate body 10 where catalytic action takes place. The insulation layer 26 also provides a barrier to prevent the induction coil 20 from shorting on the converter can 18 or the MFC 24. The insulation is suitably alumino-silicate mastic. Alternatively, the substrate body 10 can be wrapped in an alumino-silicate fiber paper. In one manufacturing method, the copper coil 20 is wrapped around the substrate body and then placed in the casing or can 18. In an alternative manufacturing method, the coil 20 and surrounding MFC 24 are placed in the can or casing 18 and the substrate body 10 is inserted into the coil/can assembly.

In one embodiment of the invention, MFC 24 is an annular cylindrical layer located immediately outside the coil 20 so as to surround some or all of the coil windings. The cylindrical layer 25 acts to increase inductive coupling to the metal elements 22 in the substrate body 10 so as to focus and increase heating. The layer 24 also provides shielding to reduce induction loss to, and heating of, the metal casing 18 and other metal components outside the converter unit. Without the MFC/shield 24, some of the magnetic flux produced by the coil 20 could spread around the coil 20 and link with external electrically conductive components in an exhaust system, and/or other components of an internal combustion engine, vehicle, generator or other electrical system or host system, thereby decreasing the life of these components and increasing energy loss. As a concentrator, the MFC 24 operates to direct or concentrate the magnetic field to the substrate body 10 providing selective or enhanced heating of regions of the substrate body 10, for example, by redirecting magnetic flux that would otherwise travel away from those regions. In particular, the layer 24 operates to concentrate the magnetic flux produced by the coil 20 towards the heating elements 22 in the substrate body 10 for more efficient heating. As an additional benefit, the MFC can improve the electrical efficiency of the induction coil 20 by increasing power transfer.

A varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements or having them reach Curie point. A suitable power input to a single brick coil is of the order of 1.1 kw, although more than 10 kW is possible.

Field produced by the electromagnetic induction coil can be tuned to the metal load to achieve high efficiency in terms of generating heat and reduced time to light-off temperature. Heating effects can be modified by appropriate selection of any or all of (a) the electrical input waveform to the coil 20, (b) nature and position of passive flux control elements such as the shield/concentrator 24, and (c) nature, position, and configuration of the coil 20. In addition, the applied field can be changed with time so that there is interdependence between the induction field/heating pattern and the particular operational phase; for example, pre-start-up, warm-up, highway driving, idling and, for hybrids, intermittent changeover from internal combustion to electric drive. In an alternative configuration, more than one coil can be used to obtain desired induction effects.

The heating pattern can be determined by appropriate location and configuration of the metal elements 22. A suitable metal for the metal elements is a ferromagnetic metal such as stainless steel grade 430 which has high magnetic permeability and corrosion resistance. Lower permeability alloys such as 300 or 400 series stainless steels may also be used. Alternative metals and non-metals such as graphite can be used depending on particular properties required. For shaping the direction and strength of magnetic flux in the substrate, lower magnetic permeability metals or alloys may be used for the metal elements in the outer cells with relatively higher magnetic permeability metals being used for metal inserts in the inner cells. Metals having very high magnetic permeability may also be used. For example, Kanthal iron-chrome-aluminum alloy stock manufactured by Sandvik has a relative permeability of 9000 and greater. High relative permeability can be achieved using stock made of other alloys including nickel-iron and iron-cobalt alloys.

Figure 4:
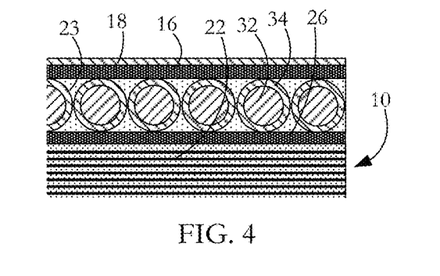
FIG. 4 is a longitudinal sectional view of a part of an inductively heated catalytic converter.
Figure 5:
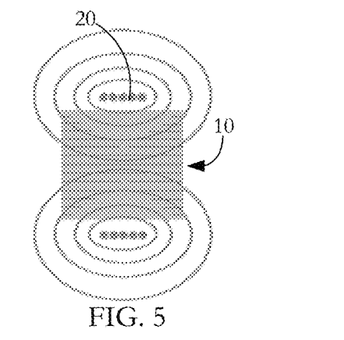
FIG. 5 shows magnetic field distribution for the catalytic converter of FIG. 4.

FIG. 4 is a cross-sectional view of a part of a catalytic converter which has no MFC. The illustrated cross-sections of windings of coil wire 32 can represent windings of a single coil or windings of more than one coil. While solid circular wires 32 with sheathing 34 are shown, other configurations including stranded wires, hollow conductors, and/or conductors of different geometric shapes can alternatively be implemented. The coil 20 is mounted in place either through mechanical/friction means or by being encased as previously described. Casing or canister 18 can be made of sheet metal or a carbon-based material. FIG. 5 is a magnetic field diagram corresponding to the converter of FIG. 4 when operational, and shows the distribution of the magnetic field radiated from the coil and the magnetic flux received by the catalytic converter substrate 10.

Figure 6:
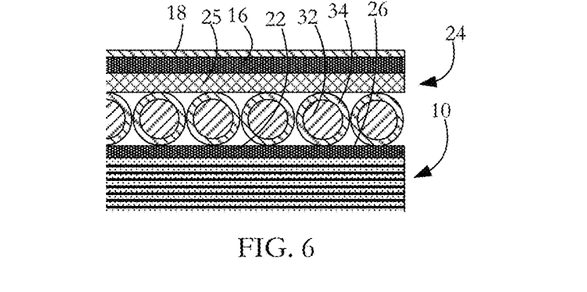
FIG. 6 is a longitudinal sectional view of a part of an inductively heated catalytic converter according to an embodiment of the invention, the converter incorporating one configuration of magnetic flux concentrator (MFC).
Figure 7:
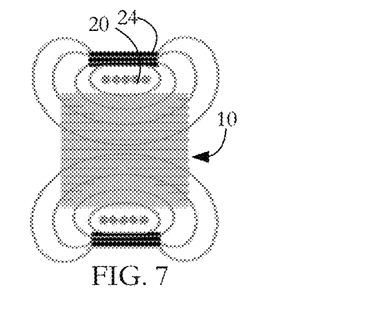
FIG. 7 shows magnetic field distribution for the catalytic converter of FIG. 6.

FIG. 6 is a cross-sectional view of a part of a catalytic converter according to an embodiment of the disclosure, the converter having an MFC formed as an annular cylindrical layer 25 which acts to change the distribution of the field radiated from the coil to increase the fraction of emitted magnetic flux that is received by the catalytic converter substrate 10. FIG. 7 is a magnetic field diagram corresponding to the converter of FIG. 6 which shows the distribution of the magnetic field radiated from the coil and the magnetic flux received by the catalytic converter substrate 10.

Figure 8:
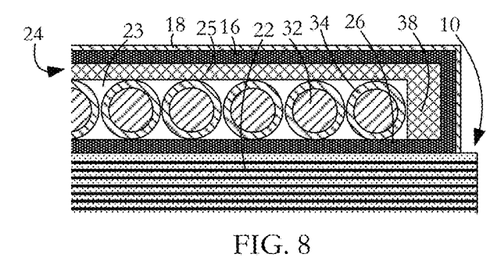
FIG. 8 is a longitudinal sectional view of a part of an inductively heated catalytic converter according to another embodiment of the invention, the converter incorporating another configuration of MFC.
Figure 9:
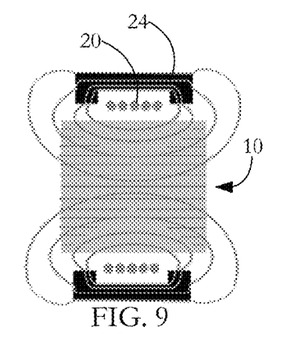
FIG. 9 shows magnetic field distribution for the catalytic converter of FIG. 8.
Figure 10:
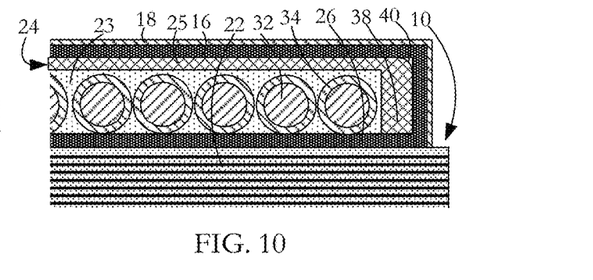
FIG. 10 is a longitudinal sectional view of a part of an inductively heated catalytic converter according to yet another embodiment of the invention, the converter incorporating a further configuration of MFC.
Figure 11:
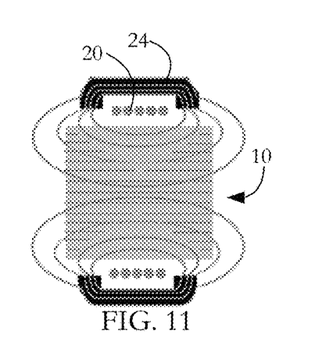
FIG. 11 shows magnetic field distribution for the catalytic converter of FIG. 10.
Figure 12:
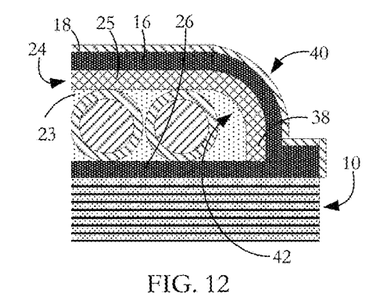
FIG. 12 is a longitudinal sectional view of a part of an inductively heated catalytic converter according to a further embodiment of the invention, the converter incorporating yet another configuration of MFC.
Figure 13:
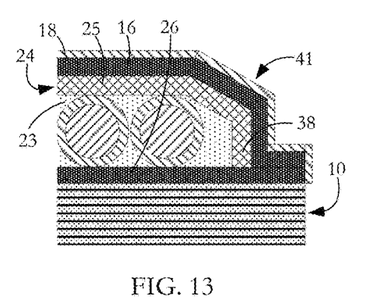
FIG. 13 is a longitudinal sectional view of a part of an inductively heated catalytic converter according to a further embodiment of the invention, the converter incorporating a variation of the MFC of FIG. 12.

In another embodiment of the invention, the MFC 24 has end parts 38 overhanging the ends of the coil 20 as shown in FIG. 8. The overhanging ends parts 38 can be made of a more robust material than the central part 25 of the MFC in terms of surviving high temperatures, even at the expense of losing some MFC performance at these locations. In addition, the overhanging parts 38 act to concentrate or focus the radiated magnetic field into the substrate body 10 from its ends as shown by the magnetic field diagram of FIG. 9. In a further embodiment of the invention as shown in FIG. 10, outer corner regions 40 of the overhanging ends 38 are radiused. The range of radiusing can be from a very small radius to a radius that is the full thickness of the MFC layer 25. One effect of radiusing is that the path of the magnetic field at the ends of the unit is directed inwardly towards the center of the unit before exiting the MFC as shown in the magnetic field diagram of FIG. 11. This configuration avoids to some extent flaring of the magnetic field into the surrounding sheet metal of the can that occurs with fully squared corners. In a variation as shown in FIG. 12, the end overhang of the MFC is radiused at both outer corner region 40 and inner corner region 42. Radiusing of the inside corner has the added benefit of facilitating hard-stuffing of the insulation-wrapped substrate into the coil during assembly. As an alternative to radiusing, the MFC ends can be angled as shown at 41 in FIG. 13 to provide the same benefits.

Figure 14:
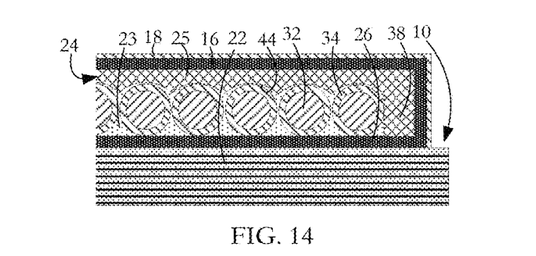
FIG. 14 is a longitudinal sectional view of a part of an inductively heated catalytic converter according to a further embodiment of the invention, the converter incorporating another variation of the MFC of FIG. 12.
Figure 15:
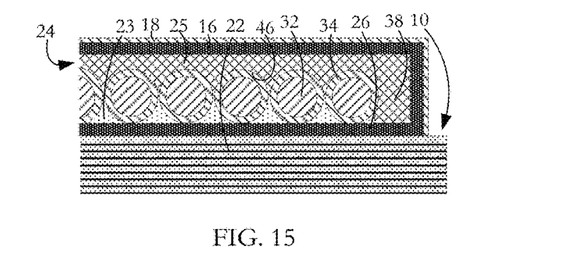
FIG. 15 is a longitudinal sectional view of a part of an inductively heated catalytic converter according to a further embodiment of the invention, the converter incorporating a further variation of the MFC of FIG. 12.

In a variation shown in FIG. 14, the MFC includes individual concentrator elements 44 arranged to at least partially surround some or all of the windings of coil 20. The concentrator elements 44 operate to contain magnetic field within the catalytic converter and further direct the magnetic field to desired regions of the substrate 10. Although the concentrator elements 44 are shown with a particular concavity, other non-convex shapes including alternative concave and angled shapes can be used. In the variation of FIG. 15, the material of MFC 24 is pressed into place onto the outer parts of the coil wire 32 so that concentrator elements 46 fully conform to the contours of wire 34. However, the MFC material is not permitted to penetrate to interstitial regions between the coil winding inner parts where the MFC would act as a magnetic shield limiting the magnetic flux directed to the substrate body 10.

Figure 16:
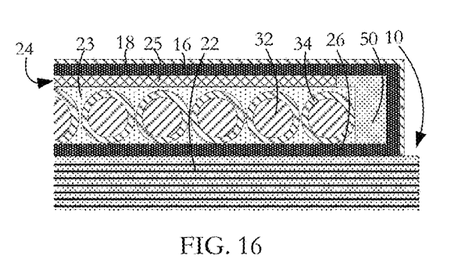
FIG. 16 is a longitudinal sectional view of an end part of an inductively heated catalytic converter according to a further embodiment of the invention, the converter incorporating a further end variation of the MFC of FIG. 12.
Figure 17:
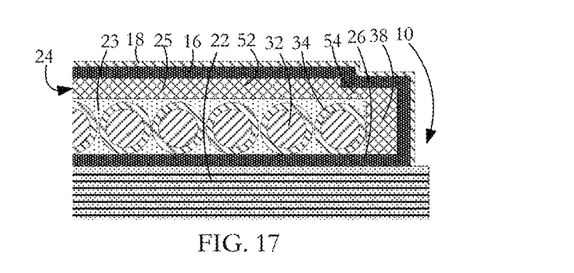
FIG. 17 is a longitudinal sectional view of an end part of an inductively heated catalytic converter according to a further embodiment of the invention, the converter incorporating yet another end variation of the MFC of FIG. 12.

The MFC embodiments described previously have uniform composition and substantially uniform thickness throughout. The coil is housed in a pocket 48 in the MFC with MFC overhanging ends 38 being thicker by about 10% to 50% than the thickness of the MFC layer 25 immediately radially outside the pocket 48. In one implementation, as shown in FIG. 16, the composition/formulation of the MFC material varies along the length of the MFC. In this case, where, in operation, the magnetic field is most intense—typically directly behind, i.e., radially outside, the coil—the material of most of the MFC annular cylinder 25 is of relatively higher grade MFC material. Relatively lower grade, thicker MFC material is used at end regions 50 where the magnetic field is less intense. Such a structural change causes negligible change in performance relative to a comparable annular cylinder of uniform composition but provides reduced cost and, with an appropriate selection of end material, improved structural properties including mechanical strength and/or corrosion resistance, etc. In a variation as shown in FIG. 17, regions 52 of the MFC material are relatively thicker where the magnetic field is relatively more intense and regions 54 of the MFC material are relatively thinner where the magnetic field is relatively less intense. In a further embodiment (not shown), variation in MFC thickness at one or both ends is configured to accommodate lead wires to and from the coil, with thickness variation and composition being tuned to obtain a desired field and heating distribution.

To make a varying composition MFC, a vertically-oriented mould cavity is filled with the proportional amount of high grade powder (A), leveled off, topped with an amount of lower grade material (B), and leveled off again. The mould material is compacted and, if required, heated to mechanically lock the structure. The two materials are selected and/or prepared so that they are compatible with one another and not subject to delamination, corrosion or other unwanted chemical reaction at the transition zone.

In other embodiments of the invention, the MFC material composition varies radially across the thickness of the MFC material or the MFC is composed of concentric shells. In a further embodiment, composition varies around the perimeter of the MFC structure. This is of value for units which are of non-cylindrical section; for example, elliptical. For non-cylindrical shapes, the distance to the centre of the unit varies, meaning that the induction field does not have radial symmetry or uniformity. Where symmetry and uniformity are desired, a relatively higher performing MFC material is used in regions having a relatively large spacing from the unit centre and a relatively lower performing MFC material is used in regions having a relatively short spacing from the unit centre. Regional variations in MFC material properties are selected to create the radial symmetry/uniformity. In one example, a square substrate with square coil and square MFC has the greatest distance to the centre at the corners and shortest distance to the centre at the mid-point along the side. Using the regional MFC composition variation, higher performance MFC material is used in the corners and lower performance MFC material is used towards the mid-point along the sides. This results in greater radial symmetry/uniformity of the induction field and thus of induction heating. Material transition between adjacent zones of different composition zone can be progressive or sudden with a bonding layer at the interface in the latter case. While field symmetry is generally desirable in this MFC application, there may be applications where field asymmetry/non-uniformity are desirable in which case variation in MFC composition can be used to introduce the desired asymmetry.

In various embodiments, the induction coil 20 can be water-cooled, for example, via a cooling system of the internal combustion engine. Cooling can help to keep the induction coil 20 and magnetic flux concentrator 24 at lower temperatures while in the presence of pins 22 that can be heated to such high temperatures as to be glowing red-hot during induction heating and the substrate itself that reaches and exceeds light-off temperatures during operation. Water-cooling of the induction coil 20 may not always be the desired solution however because routing engine coolant to the location of the induction system can add cost to the implementation of the induction heated catalyst assembly.

Suitable magnetic flux concentrator materials typically have a very high magnetic permeability within a narrow range of frequencies determined by the particular structure and composition of the gaseous emissions treatment assembly. One suitable magnetic flux concentrator material is based on carbonyl iron powder. High permeability is achieved through high density which, in turn, is achieved through high pressure compaction of the powder. After compaction, the tight proximity of the powder particles facilitates a preferred path for magnetic flux from an induction coil. The carbonyl powder is prepared so that when used in the MFC, it does not sinter unacceptably in response to high temperature conditions because a transition from compacted powder to semi-solid material would result in MFC performance loss. Depending on a number of operating factors, the temperature in the core of the converter can reach of the 900° C. or more. Even with the insulating layer located between the core and the MFC, the temperature at the MFC can reach of the order of 500° C.

The insulating layer is less effective in limiting the heat to the ends where hot gaseous emissions enter and leave the unit. In one embodiment of the invention, in order to protect end parts of the coil and MFC from the intense heat, they are made shorter than the substrate to space their ends from the sites of hot incoming and outgoing gases. The spacing is driven by the temperature to which the coil and MFC ends are expected to experience in operation. For example, aided by the presence of the insulation layer, a 5 mm back spacing has been found generally sufficient for an expected core temperature of 750° C., an 8 mm back spacing for 890° C., and 10 mm for a gasoline exhaust temperature of 1050° C. The objective is to have positioning and the thermal insulation layer reduce the temperature at the MFC from the core temperature down to about 500 to 600° C. which is close to current MFC material operational limits.

In one embodiment, SQ-R grade carbonyl iron powder from BASF was used as the material for the MFC, the powder having spherical particles compacted to a pressure of 550 MPa and stabilized in a 1.25% EPON™ 1004 or 1001 resin available from Miller-Stephenson. In use, at a temperature of 500° C., there was no material deformation of the particles and almost no reduction in initial permeability (between 50 and 60) over a range of operational frequencies between 10 kHz and 200 kHz. Compaction density can be slightly reduced to reduce particle sintering risk. The magnetic flux concentrator 508 is formed by mixing the carbonyl powder with the resin and press-forming the mixture in an annular die corresponding to the desired shield/concentrator shape. The pressing process utilized a die having an annular die temperature between 25° C. and 300° C., an annular ring press having a press pressure between 25,000 lbf (113 kN) and 50,000 lbf (226 kN) and a press hold time of about 10 minutes. Higher pressures can produce higher permeability but often at the sacrifice of high temperature durability. Very high pressures applied over shorter times down to 30 seconds, with or without die heating, can produce comparable or improved combinatorial permeability/temperature durability properties.

Generally, materials suitable for use in a magnetic flux concentrator/shield for emissions treatment units of the type previously described have a number of desirable properties. Firstly, such materials ideally, but not exclusively, have an operating frequency range of from 10 kHz to 100 kHz, this being the typical range of resonant absorption peaks for current designs of catalytic converter having inductively heated pins. In this range, core losses in the MFC material are relatively low and do not unacceptably reduce the fraction of radiated energy delivered into the interior of the converter. However, MFC materials with an operating frequency outside this range, for example, in a range from 1 kHz to 1000 kHz can be of value in other applications.

Secondly, such materials ideally, but not exclusively, have an initial permeability in the range 35-55. While lower permeability materials are commercially available and may be better able to survive thermal cycling to 500 degrees C., this is normally at the expense of a significantly increased thickness of material required to achieve the initial permeability level of 35. While this may not be a problem for specialist applications, available space in commercial catalytic converters and particulate filters makes use of such lower permeability materials more problematic. On the other hand, while ultra-high permeability materials are commercially available, such materials generally undergo a large permeability loss after thermal cycling to temperatures of the order of 500 degrees C. This change would materially affect the resonant circuit for tuning induction heating of a catalytic converter/particulate filter and does not justify the high material cost. However, MFC materials with an initial permeability outside the 35-55 range, for example, in a range from 10 to 150 can be of value in other applications.

Thirdly, such materials ideally, but not exclusively, undergo less than a 10% loss in permeability after temperature cycling to 500° C. As indicated previously, ultra-high permeability materials are typically not as thermally stable as commercially available lower permeability materials as they incorporate low-temperature susceptible materials and/ or undergo structural changes upon heating that make the material more like a solid metal.

Fourthly, materials used in an MFC structure are ideally, but not exclusively, compacted powder feedstock having a median particle diameter (or D50) in the range 3 to 5 micrometer although powder having a D50 in a range from 1 to 10 micrometers can be of value in other applications. Included among suitable commercially available materials are, for example, Fluxtrol 50™, Fair-Rite 67™, and Micrometals-60™ and Micrometals-63™. High permeability, low power loss ferrites may also have application in inductively heated gaseous emissions treatment units.

While the foregoing focuses primarily on the operation of a catalytic converter, the shield/concentrator structures and materials disclosed herein can likewise be applied to the operation and control of a diesel oxidation catalyst, diesel particulate filters, gasoline particulate filters, selective catalytic reduction devices and other emission control devices. While the use of a MFC has been described for concentrating magnetic field and heating at metal pins located in cells of an emission control device, the MFC configurations and materials described can be used to heat other conducting elements within such a device including metal located within the substrate material walls themselves, catalyst metal coating the walls of the substrate, and metal content in the cells of alternative form from pins/wires such as metal power and solidified molten metal.

What is claimed is:

1. A gaseous emissions treatment system comprising a gaseous emissions treatment unit for treating gaseous emissions flowing through the unit, a magnetic field generator mounted adjacent the gaseous emissions treatment unit that radiates a varying magnetic field in response to a control signal thereby to inductively heat the gaseous emissions treatment unit, at least a part of the magnetic field generator located between the gaseous emissions treatment unit and a magnetic field modifying member, the modifying member acting to concentrate the radiated varying magnetic field at the gaseous emissions treatment unit.

2. The gaseous emissions treatment system of claim 1, the modifying member further acting to limit the radiated varying magnetic field reaching a region on the distal side of the modifying member from the gaseous emissions treatment unit.

3. The gaseous emissions treatment system of claim 1, at least a part of the modifying member having the form of an annular cylinder.

4. The gaseous emissions treatment system of claim 3, at least a part of the annular cylinder having a wall thickness of between 1 and 20 millimeters.

5. The gaseous emissions treatment system of claim 4, at least a part of the annular cylinder having a wall thickness of between 3 and 5 millimeters.

6. The gaseous emissions treatment system of claim 5, wherein the modifying member includes a plurality of concentrator elements.

7. The gaseous emissions treatment system of claim 6, wherein at least one of the concentrator elements is a generally cylindrical element surrounding the coil.

8. The gaseous emissions treatment system of claim 6, wherein at least one of the concentrator elements is an end element overhanging an end of the coil.

9. The gaseous emissions treatment system of claim 8, wherein the end element has an outwardly facing surface part curving from a first region at a first distance from a central longitudinal axis of the unit to a second region at a second distance from said axis, the first region being further from said axis than the second region and the second region being closer to one end of the unit than the first region.

10. The gaseous emissions treatment system of claim 8, wherein the end element has an outwardly facing surface part inclined from a first region at a first distance from a central longitudinal axis of the unit to a second region at a second distance from said axis, the first region being further from said axis than the second region and the second region being closer to one end of the unit than the first region.

11. The gaseous emissions treatment system of claim 6, wherein a plurality of the concentrator elements extending along the unit have non-convex faces to concentrate the varying magnetic field at predetermined regions along the unit.

12. The gaseous emissions treatment system of claim 1, the magnetic field generator comprising a coil.

13. The gaseous emissions treatment system of claim 12, wherein at least a part of the coil is separated from at least a part of the modifying member by electrically insulating material.

14. The gaseous emissions treatment of claim 12, wherein at least a part of a surface contour of the modifying member conforms to a surface contour of an adjacent part of the coil.

15. The gaseous emissions treatment system of claim 1, further comprising a plurality of conductive elements in the gaseous emissions treatment unit and wherein the magnetic field generator is operable to heat the gaseous emissions treatment unit by inductively heating the conductive elements.

16. The gaseous emissions treatment system of claim 15, wherein the conductive elements are heated by at least one of eddy currents and magnetic hysteresis generated by the varying magnetic field.

17. The gaseous emissions treatment system of claim 1, at least part of the modifying member is made of one of compacted carbonyl iron powder and compacted ferrite powder.

18. The gaseous emissions treatment system of claim 1, wherein the composition of at least a part of the modifying member is a flux concentrator material having an operating frequency in the range 1 kHz-1000 kHz.

19. The gaseous emissions treatment system of claim 18, wherein the flux concentrator material has an operating frequency in the range 10 kHz-100 kHz.

20. The gaseous emissions treatment system of claim 1, wherein the composition of at least a part of the modifying member is a flux concentrator material having an initial permeability in the range 10-150.

21. The gaseous emissions treatment system of claim 20, wherein the flux concentrator material has an initial permeability in the range 35-55.

22. The gaseous emissions treatment system of claim 1, wherein the composition of at least a part of the modifying member is a flux concentrator material having less than a 10% loss in permeability when subjected to temperature cycling up to a temperature of 500 degrees C.

23. The gaseous emissions treatment system of claim 1, wherein the composition of at least a part of the modifying member is a flux concentrator material made from compacted powder feedstock having a median powder particle size of from 1 to 10 micrometers.

24. The gaseous emissions treatment system of claim 23, wherein the flux concentrator material is made from compacted powder feedstock having a median powder particle size of from 3 to 5 micrometers.

25. The gaseous emissions treatment system of claim 1, wherein the composition of at least a part of the modifying member is a flux concentrator material commercially available under one the trademarks Fluxtrol 50™, Fair-Rite 67™, and Micrometals-60™ and Micrometals-63™.

26. A method of treating gaseous emissions comprising flowing gaseous emissions to be treated through a gaseous emissions treatment unit, radiating a varying magnetic field from a magnetic field generator mounted adjacent the gaseous emissions treatment unit thereby to inductively heat the gaseous emissions treatment unit in response to a control signal, and using a magnetic field modifying member located on a side of the magnetic field generator remote from the gaseous emissions treatment unit to concentrate the radiated varying magnetic field at the gaseous emissions treatment unit.

* * * * *